(12) United States Patent
Davis et al.

(10) Patent No.: US 8,752,204 B2
(45) Date of Patent: Jun. 10, 2014

(54) IDENTIFYING AND REDACTING PRIVILEGED INFORMATION

(75) Inventors: Pamela H. Davis, Santa Clara, CA (US); Theresa Hughes Beaumont, San Francisco, CA (US); Shailesh Kumar, Andhra Pradesh (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/564,032

(22) Filed: Aug. 1, 2012

(65) Prior Publication Data

US 2013/0036478 A1      Feb. 7, 2013

(30) Foreign Application Priority Data

May 8, 2011    (IN) ........................... 2698/CHE/2011

(51) Int. Cl.
 *H04N 7/16*      (2011.01)
(52) U.S. Cl.
 USPC .......................................................... 726/28

(58) Field of Classification Search
 None
 See application file for complete search history.

(56) References Cited

U.S. PATENT DOCUMENTS

2007/0030528 A1* 2/2007 Quaeler et al. ................ 358/453
2010/0229246 A1* 9/2010 Warrington et al. ............ 726/28

* cited by examiner

*Primary Examiner* — Brandon Hoffman
(74) *Attorney, Agent, or Firm* — Sterne, Kessler, Goldstein & Fox P.L.L.C.

(57) ABSTRACT

Systems and methods for identifying and redacting privileged information automatically in electronic discovery documents such as emails are disclosed. In reviewing documents for discovery review, some documents have both privileged and non-privileged information. Significant cost savings are achieved in conducting electronic discovery by automatically identifying and redacting privileged content while preserving non-privileged information for production.

17 Claims, 7 Drawing Sheets

```
From: john@mycompany.com
Sent: Friday, September 10, 2010 11:12 AM
To: employee@adverseparty.com
Subject: FW: Follow up on conversation

AP,

See the below email.

John

-----Original Message-----
From: chris@mycompany.com
Sent: Thursday, September 10, 2010 10:44 AM
To: john@mycompany.com
Subject: Re: Follow up on conversation John, When you get in, let's talk about Stanley.

Chris

-----Original Message-----
From: stanley@mycompany.com
Sent: Wednesday, September 9, 2010 7:18 PM
To: chris@mycompany.com; mike@ourlawyer.com
Subject: Follow up on conversation

PRIVILEGED AND CONFIDENTIAL

Chris and Mike,

Does it matter if the light was red?

Stanley
```

Panel 608 (602):
```
From: bob@ourlawyer.com
Sent: Friday, September 10, 2010 11:12 AM
To: john@mycompany.com
Subject: Re: FW: Follow up on conversation

PRIVILEGED AND CONFIDENTIAL

John,

It matters.

B. Loblaw, Esq.

-----Original Message-----
From: john@mycompany.com
Sent: Wednesday, September 9, 2010 7:18 PM
To: mike@ourlawyer.com
Subject: FW: Follow up on conversation Counselor, Does it matter if the light was red?

John

-----Original Message-----
From: chris@mycompany.com
Sent: Tuesday, September 8, 2010 8:44 AM
To: john@mycompany.com
Subject: Follow up on conversation John, What do we do if the light was red?

Chris
```

Panel 610 (604):
```
-----Original Message-----
From: chris@mycompany.com
Sent: Tuesday, September 8, 2010 8:44 AM
To: john@mycompany.com
Subject: Follow up on conversation John, What do we do if the light was red?

Chris
```

FIG. 7

IDENTIFYING AND REDACTING PRIVILEGED INFORMATION

CROSS-REFERENCE TO RELATED APPLICATIONS

This application claims priority to Indian Provisional Application No. 2698/CHE/2011, filed Aug. 5, 2011, which is incorporated by reference herein in its entirety.

FIELD

Embodiments generally relate to electronic discovery systems and methods in the context of litigation and applications thereof.

BACKGROUND

In litigation, significant cost is expended through the process of discovery. As organizations increasingly maintain documents and emails in electronic form, the universe of documents potentially relevant to a given litigation matter is also increasing. Currently, parties to litigation incur time and expense in collecting, reviewing, and producing this electronic discovery or e-discovery. A manual review of documents identified as responsive in a litigation contributes significantly to this cost. Parties to litigation require a cost effective way to balance the goal of identifying and producing all material relevant to a litigation without damaging their case through inadvertent disclosure of privileged information.

BRIEF SUMMARY

Disclosed herein are systems and methods relating to identifying and redacting privileged information automatically in electronic discovery documents such as emails.

In an embodiment, a method for redacting privileged information from an email thread includes: identifying a set of email threads containing one or more potentially privileged emails; locating a particular email thread in the set of email threads containing correspondence with a non-privileged party; when the correspondence with the non-privileged party is a last-in-time email, marking the email thread as non-privileged; and when the correspondence with the non-privileged party is not the last-in-time email, automatically redacting emails from the email thread that are later in time than the correspondence with the non-privileged party.

In another embodiment, a method for redacting privileged information from an email thread includes: identifying a set of email threads containing one or more potentially privileged emails; locating a particular email thread in the set of email threads containing correspondence with a privileged party; and when the correspondence with the privileged party is not the last-in-time email, automatically redacting emails from the email thread that are later in time than the correspondence with the privileged party, including the correspondence with the privileged party.

In another embodiment, a computer implemented method for redacting, at a server, privileged information from an email thread includes: receiving, at the server, an email thread containing potentially privileged information; searching the email thread for an adverse party in a last-in-time communication; searching the email thread for an adverse party not in the last-in-time communication; searching the email thread for an attorney in the last-in-time communication; searching the email thread for an attorney not in the last-in-time communication; determining a portion of the email thread that is privileged; and automatically redacting the portion of the email thread that is privileged.

In another embodiment, a computer-based system for redacting privileged information from an email thread includes: one or more processors; one or more repositories configured to store at least one of responsive documents, privileged parties, adverse parties, or privilege terms; a privilege determination module configured to receive a selected one of the responsive documents and to determine whether the selected responsive one of the responsive documents is privileged based on the presence of at least one of the privileged parties, adverse parties, or privileged terms; and an output module configured to redact portions of the selected responsive document based on the privilege determination of the privilege determination module.

In another embodiment, a tangible computer program product includes a computer readable storage medium having computer program logic recorded thereon that, when executed by a processor, causes the processor to: identify a set of email threads containing, one or more potentially privileged emails; locate a particular email thread in the set of email threads containing correspondence with a non-privileged party; when the correspondence with the non-privileged party is a last-in-time email, mark the email thread as non-privileged; and when the correspondence with the non-privileged party is not the last-in-time email, automatically redact emails from the email thread that are later in time than the correspondence with the non-privileged party.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. These figures are intended to be illustrative, not limiting.

DETAILED DESCRIPTION

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments relate to systems and methods for identifying responsive and potentially privileged documents in an email collection and marking the emails for review and production. Email, as used herein, refers to any digital medium for exchanging messages from an author to one or more recipients. In one embodiment, the system identifies documents for redaction based on a ranking of the likelihood of privilege, whether a redaction is necessary, and/or the presence of adverse third parties in emails. In an embodiment, the system uses a list of email recipients to identify documents likely to require redaction, documents most likely to be privileged, documents least likely to be privileged, and documents for which no viable privilege claim can be made.

Electronic discovery is a costly component of litigation. In particular, the proliferation of email communication in the modern business entity has resulted in an exponential increase in the amount of electronic files generated by these entities. A party to a litigation must strike a careful balance between fulfilling its duty to respond fully and completely to discovery requests from the opposing party and ensuring that only responsive documents are produced. Conducting a manual review of electronic documents including email is quickly becoming virtually impossible within any reasonable time frame and budget. Reviewing emails for privileged information provides an added level of complexity because of the additional level of scrutiny required. In the case of attorney-client privilege, for example, not all communications within a particular email thread may be privileged, and thus, it may not be proper to withhold as privileged that portion of the email thread that does not constitute an attorney-client communication.

Figure 1:
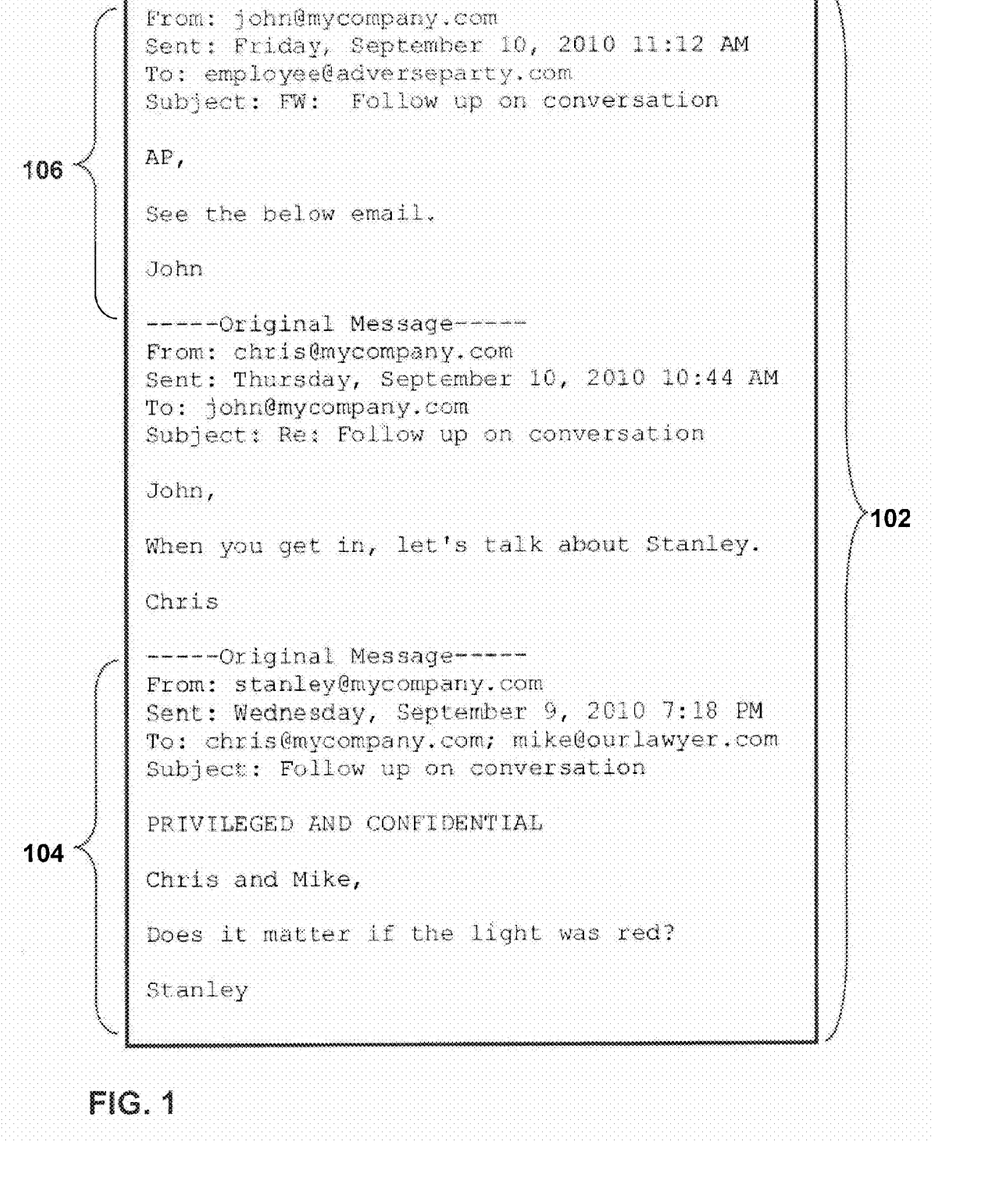
FIG. 1 illustrates an exemplary document responsive to issues in a litigation.

FIG. 1 is an illustration of an example thread of email communications 102 containing both privileged and non-privileged information. An email thread may be a first email and the sequence of successive email messages following and related to the first email. A first email 104 in thread of emails 102 is an attorney-client privileged email from a company employee to another employee and a company lawyer. Privileged communication is not to be disclosed during discovery; however, in this particular email thread 102, a later email 106 from a company employee to an adverse, outside party disclosed the contents of the entire thread, thus breaking privilege. Embodiments of the systems and methods disclosed herein are related to automated review of electronic documents identified in litigation as being potentially responsive to a matter at issue in a litigation, and identifying and redacting privileged information in emails automatically where appropriate.

Figure 2:
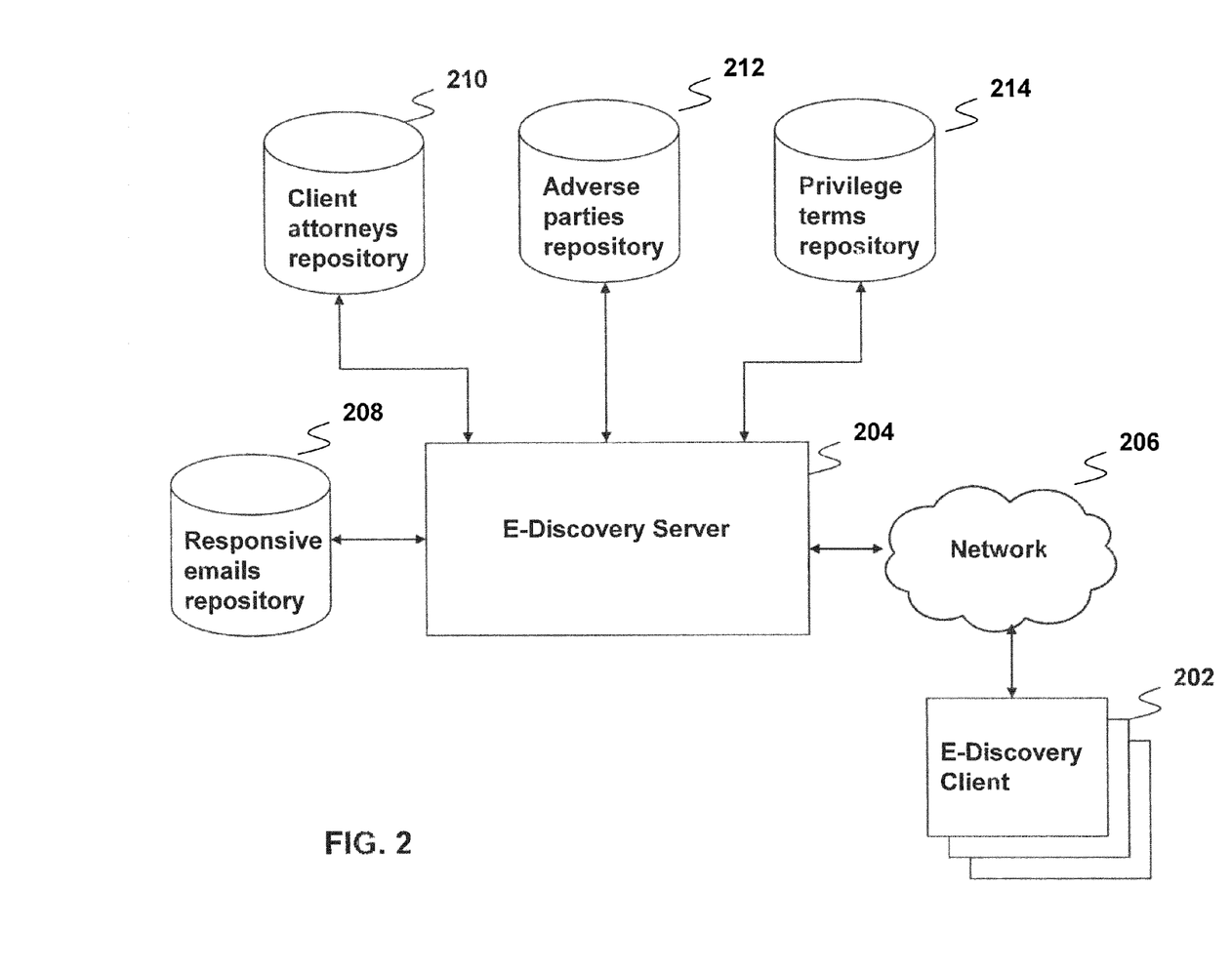
FIG. 2 illustrates a client server architecture, according to one embodiment.

FIG. 2 illustrates a client-server architecture according to an embodiment. One or more e-discovery clients 202 may be connected to an e-discovery server 204 over a network 206. Network 206 can be any network or combination of networks that can carry data communications, and may be referred to herein as a computer network. Such network 206 can include, but is not limited to, a local area network, medium area network, and/or wide area network such as the Internet. Network 206 can support protocols and technology including, but not limited to, World Wide Web protocols and/or services. Intermediate web servers, gateways, or other servers may be provided between components of FIG. 2, depending upon a particular application or environment.

Server 204 is connected to one or more data repositories such as databases. A data repository may be located on a storage location, or may be distributed across multiple storage locations. In the embodiment of FIG. 2, server 204 is connected to a repository 208 of e-discovery documents, for example, email documents that have been identified as responsive to a litigation issue. Emails maintained in repository 208 of e-discovery documents may be in native format or in searchable image format. In some embodiments, server 204 may also be connected to a repository 210 containing an identification of attorneys representing the litigant conducting e-discovery. Attorney identifiers maintained in repository 210 may include, for example and without limitation, attorney names, initials, nicknames and/or email addresses. In some embodiments, server 204 may also be connected to a repository 212 containing an identification of parties adverse to the litigant conducting e-discovery. These adverse parties can be opposing litigants, attorneys and agents of opposing litigants, or other parties adverse to the litigant. Adverse parties may be identified by, for example, names of individuals, law firm names, company names, email addresses, domain names, initials, or other adverse party identifiers maintained in repository 212 containing an identification of parties adverse to the litigant conducting e-discovery. In some embodiments, server 204 may also be connected to a repository 214 containing an identification of privilege terms. Privilege terms may be terms identified by, for example, the litigant or the litigant's counsel as terms likely to indicate that the subject of the email is privileged.

E-discovery server 204 may receive as input documents from repository 208 of e-discovery documents. In an embodiment, e-discovery server 204 can identify whether a document potentially contains privileged information by comparing the information in the email with information maintained in, for example, repository 210 containing an identification of attorneys representing the litigant conducting e-discovery, repository 212 containing an identification of parties adverse to the litigant conducting e-discovery, and/or repository 214 containing an identification of privilege terms.

In some embodiments, server 204 may be connected to an e-discovery client 202 that allows a user to review e-discovery documents. In other embodiments, e-discovery client 202 may allow the user to prepare relevant e-discovery for production in the litigation.

Figure 3:
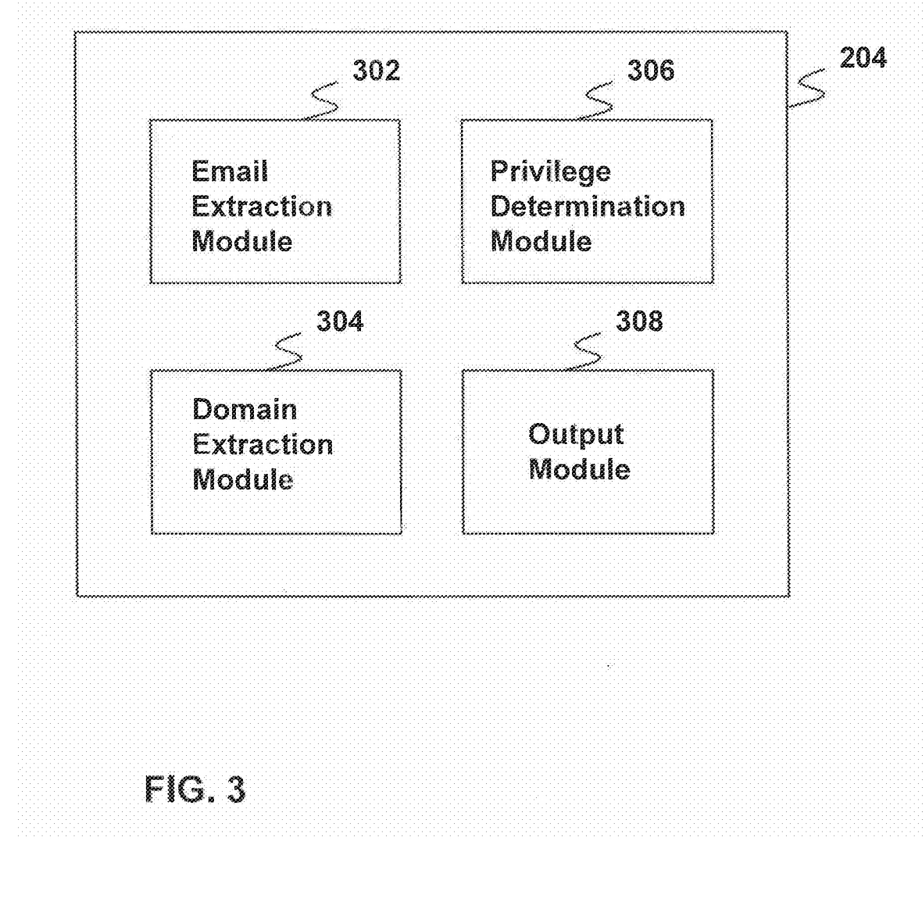
FIG. 3 illustrates a server architecture, according to one embodiment.

In some embodiments, e-discovery server 204 may implement modules for performing automated redaction of privileged information. As illustrated in FIG. 3, e-discovery server 204 may contain an email extraction module 302. Email extraction module 302 may receive as input one or more emails maintained in repository 208 of e-discovery documents. Email extraction module 302 identifies the message headers contained in a particular email message thread. Email extraction module 302 may extract email addresses for comparison against email addresses maintained in repository 210 containing an identification of attorneys representing the litigant conducting e-discovery or repository 212 containing an identification of parties adverse to the litigant conducting e-discovery. Email extraction module 304 may identify the email received as input as potentially privileged or not privileged depending on whether an email address maintained in the repository 210 containing an identification of attorneys representing the litigant conducting e-discovery or an email address maintained in repository 212 containing an identification of parties adverse to the litigant conducting e-discovery is found in the email thread.

E-discovery server 204 may contain a domain extraction module 304. Domain extraction module 304 may receive as input one or more emails maintained in repository 208 of e-discovery documents. Domain extraction module 304 identifies the message headers contained in a particular email message thread. Domain extraction module 304 may extract domain names from the message headers for comparison against domain names maintained in the repository 210 containing an identification of attorneys representing the litigant conducting e-discovery or repository 212 containing an identification of parties adverse to the litigant conducting e-discovery. For example, if an email message contains an email address having the domain name mylawyer.com, domain extraction module 304 can compare this domain to those maintained in the repository 210 containing an identification of attorneys representing the litigant conducting e-discovery or repository 212 containing an identification of parties adverse to the litigant conducting e-discovery to determine whether the domain name belongs to attorneys of the litigant or to an adverse party. Domain extraction module 304 may identify the email received as input as potentially privileged or not privileged depending on whether a domain name maintained in the repository 210 containing an identification of attorneys representing, the litigant conducting e-discovery or a domain name maintained in repository 212 containing an identification of parties adverse to the litigant conducting e-discovery is found in the email thread.

E-discovery server 204 may contain a privilege determination module 306. Privilege determination module 306 may receive as input one or more emails maintained in repository 208 of e-discovery documents. Privilege determination module 306 identifies whether privilege terms maintained in repository 214 containing an identification of privilege terms are contained in a particular email message thread. Privilege determination module 306 may identify the email received as input as potentially privileged or not privileged depending on whether the privilege term is found in the email thread.

E-discovery server 204 may contain an output module 308. Output module 308 may receive as input one or more emails maintained in repository 208 of e-discovery documents. Output module 306 may redact a portion of the email depending on the determinations made by email extraction module 302, domain extraction module 304, or privilege determination module 306. Output module 308 may prepare the emails in responsive emails repository 208 for further review by a user, for segregation from the responsive documents due to privilege, or for production as non-privileged, responsive documents.

Figure 4:
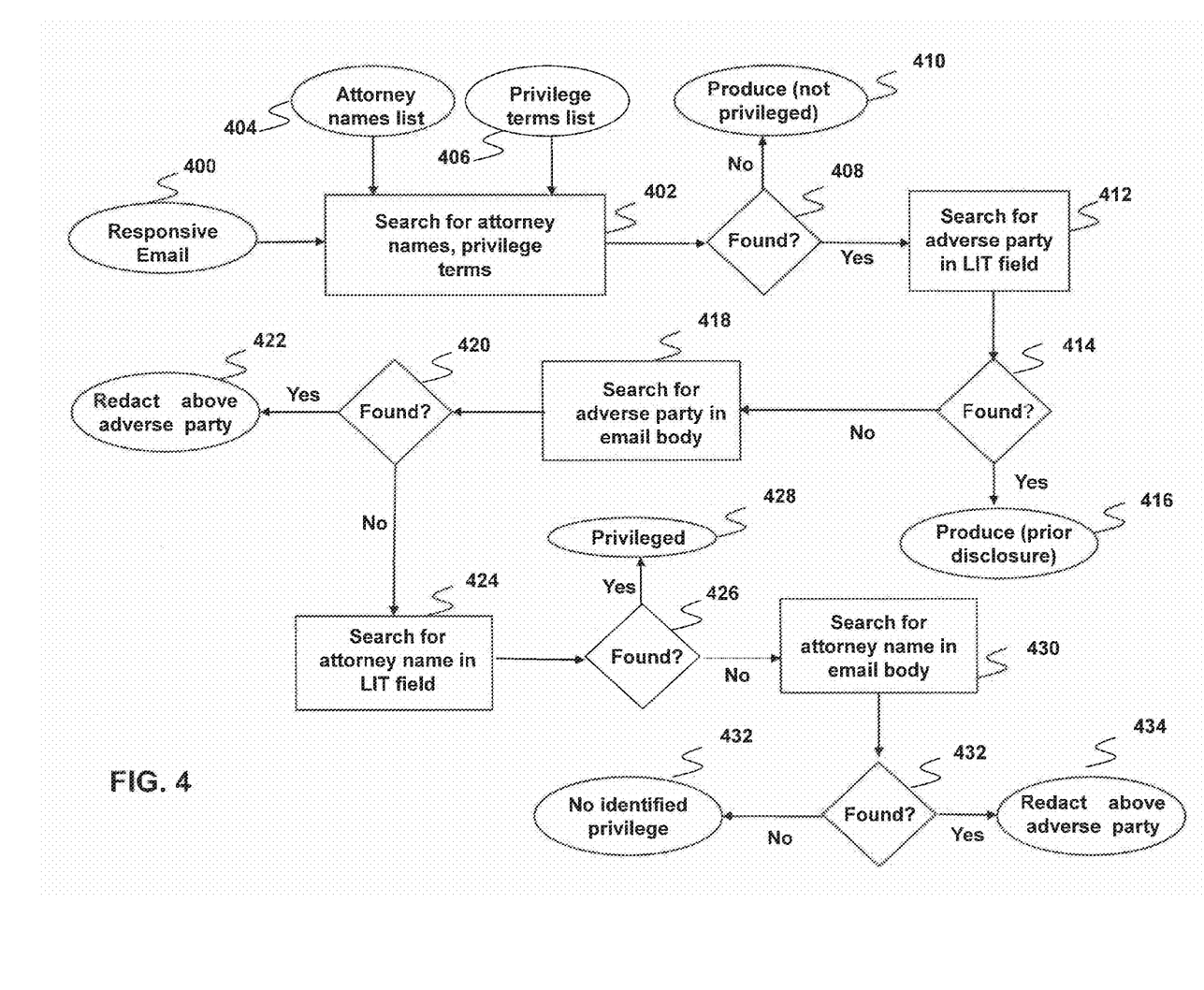
FIG. 4 illustrates a flowchart illustrating an exemplary aspect of operation, according to one embodiment.

FIG. 4 is a flow chart illustrating exemplary operations that may be performed in an embodiment. In stage 402, a responsive document, e.g. an email, from the responsive set of documents 400 is searched for, for example, attorney names maintained in repository 210 containing an identification of attorneys representing the litigant conducting e-discovery and privileged terms maintained in repository 214 containing an identification of privilege terms. Inputs received for conducting searches, such as attorney names or privilege terms, may be automatically or manually generated. For example, in stage 402, an attorney names list 404 or a privilege terms list 406 may be received for searching a responsive document. In stage 408, if no attorney name and no privilege terms are found, then in stage 410 the responsive document is identified or marked for production. In some embodiments, documents may be identified or marked for production by setting a flag in the document record. Alternatively or in addition, in some embodiments documents may be identified or marked for production by segregating the document from non-produced documents. Downstream determination of privilege will ignore those documents already identified as not privileged, i.e., to be produced.

If, in stage 408, an attorney name or privilege term is found, then the document is identified as potentially privileged and, in stage 412, the responsive document is searched for an adverse party in the last-in-time ("LIT") to:, from:, cc:, or bcc: fields, and the email address are extracted. A communication is the LIT communication when it is at the top of, or is the most recent communication in, a string of communications such as an email thread. In FIG. 1, LIT communication 106 appears at the top of email thread 102 and has the most recent timestamp of all messages in email thread 102. In stage 414, if the email contains an adverse party in a LIT field, then in 416 the email is identified as not privileged. These emails are not privileged because the entire document has been shared with an adverse party by virtue of the LIT communication, so privilege is broken and the document should be produced. Documents may be identified as not privileged by, for example, setting a flag in the document record or segregating the document from the potentially privileged documents.

If, in stage 414, the responsive document does not contain an adverse party in a LIT field, then in stage 418 the responsive document is searched for an adverse party in the body of the document, i.e., not involved in the LIT communication. In stage 420, if communication involving an adverse party is found in the body of the document, then in stage 422 the portion of the document later in time or more recent than the communication involving an adverse party should be redacted. The communication involving the adverse party and any communication earlier in time have already been disclosed to an adverse party, and privilege is broken for that portion of the document. The remainder of the document should be redacted before production.

If, in stage 420, no adverse party communication is found in the body of the responsive document, then in stage 424 the responsive document is searched for an attorney name in the LIT communication. In stage 426, if an attorney name is found in the LIT communication, then in stage 428 the document is identified as privileged or most likely privileged. These emails likely are privileged based on attorney advice content by virtue of the LIT communication, so further privilege review may be necessary. If, in stage 426, an attorney name is not found in the LIT communication, then in stage 430 the responsive document is searched again for an attorney name appearing in a position in the document other than in the LIT communication. In stage 432, if an attorney name is found in the body of the document, i.e., in a position other than the LIT communication, then in stage 434, the attorney communication and any later in time communication should be redacted and the document identified for production. The attorney communication and later in time communication are candidates for redaction because the portion of the document relating to attorney advice should be redacted, while portions of the email preceding and following the communication with the attorney that are not attorney-client privileged should be produced. If, in stage 432, no attorney name is found in the responsive communication, then in stage 436, the responsive document is identified as not attorney-client privileged and is output for further analysis regarding work product privilege and/or indirect attorney advice based on privilege terms found in stage 402 that lead to the document being identified as potentially privileged. In this manner, a lesser number of documents are output for manual review compared to previous methods, thus saving review time and resources.

Figure 5:
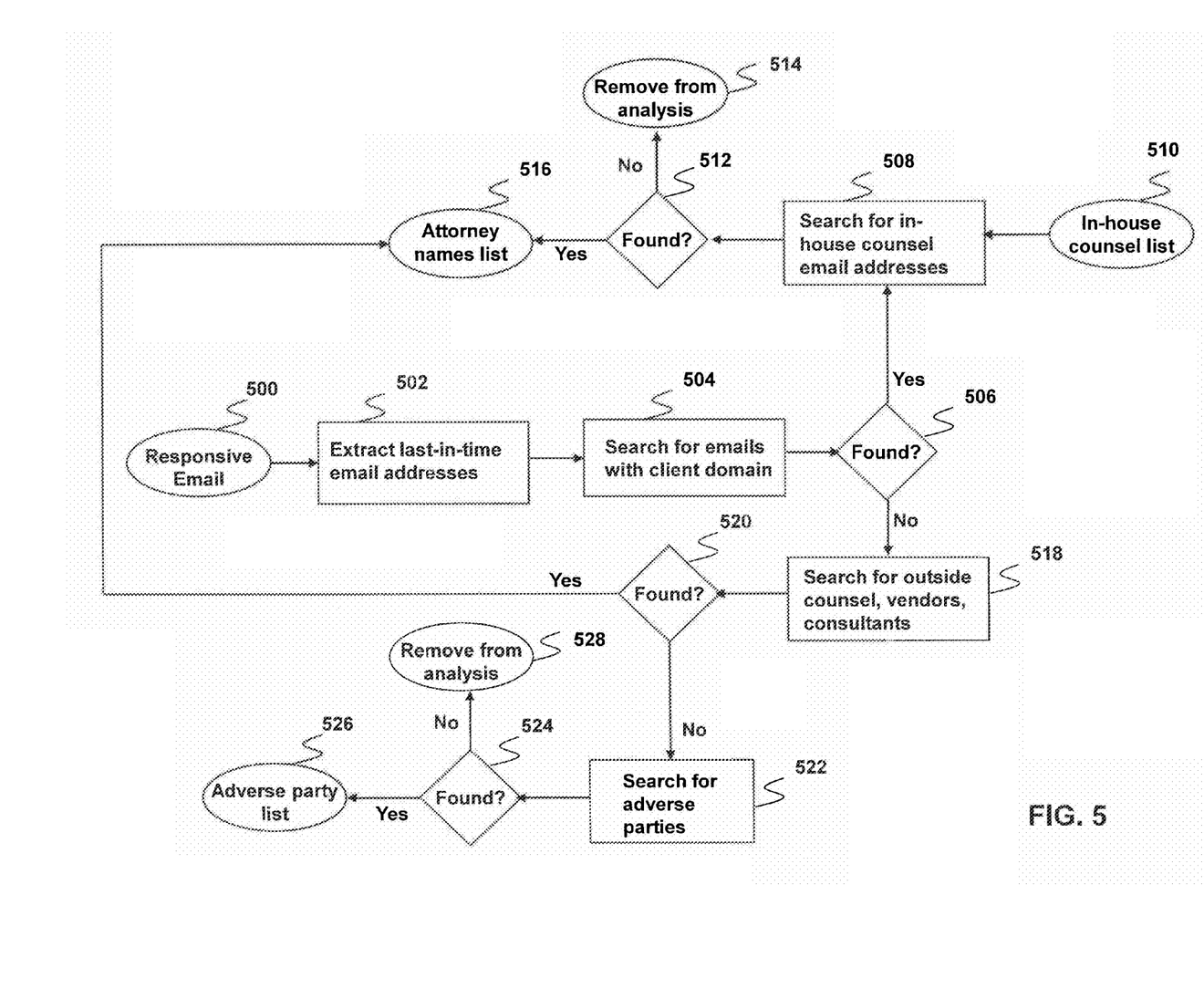
FIG. 5 illustrates a flowchart illustrating an exemplary aspect of operation, according to one embodiment.

FIG. 5 is a flow chart illustrating exemplary operations for automatically generating an attorney names list and an adverse parties list that may be performed in an embodiment. These lists can be maintained in repositories such as repository 210 containing an identification of attorneys representing the litigant conducting e-discovery and repository 212 containing an identification of parties adverse to the litigant conducting e-discovery. These lists can optionally be used in an embodiment such as that illustrated in FIG. 4 to identify and redact privileged information.

In stage 502, LIT email addresses are extracted from a responsive document, e.g. an email, from the responsive set of documents 500. In stage 504, these email addresses are searched for addresses from the domain of the party conducting e-discovery, indicating the email address potentially belongs to a company employee. In stage 506, if email addresses from the domain of the party conducting e-discovery are found, then in stage 508 the identified email addresses are searched to determine whether in-house counsel email addresses are present. A list of in-house counsel 510 may be provided as an input. In stage 512, if email addresses of in-house counsel are not found, then in stage 514 the email addresses searched are removed from the list generation analysis. If, in stage 512, email addresses of in-house counsel are found, then in stage 516 the identified email addresses are added to the list of attorney names generated.

If, in stage 506, email addresses from the domain of the party conducting e-discovery are not found, then in stage 518 the email addresses are searched to determine whether outside counsel email addresses or email addresses belonging to vendors or consultants related to the litigation are present. In stage 520, if email addresses of outside counsel, litigation vendor personnel, or litigation consultants are found, then the identified email addresses are added to the list of attorney names generated 516.

If in stage 520, email addresses of outside counsel, litigation vendor personnel, or litigation consultants are not found, then in stage 522 the email addresses are searched to determine whether email addresses of adverse parties are present. In stage 524, if email addresses of adverse parties are found, then in stage 526 the identified email addresses are added to the list of adverse parties generated. If in stage 524 email addresses of adverse parties are not found, then in stage 528 the email addresses searched are removed from the list generation analysis.

Figure 6:
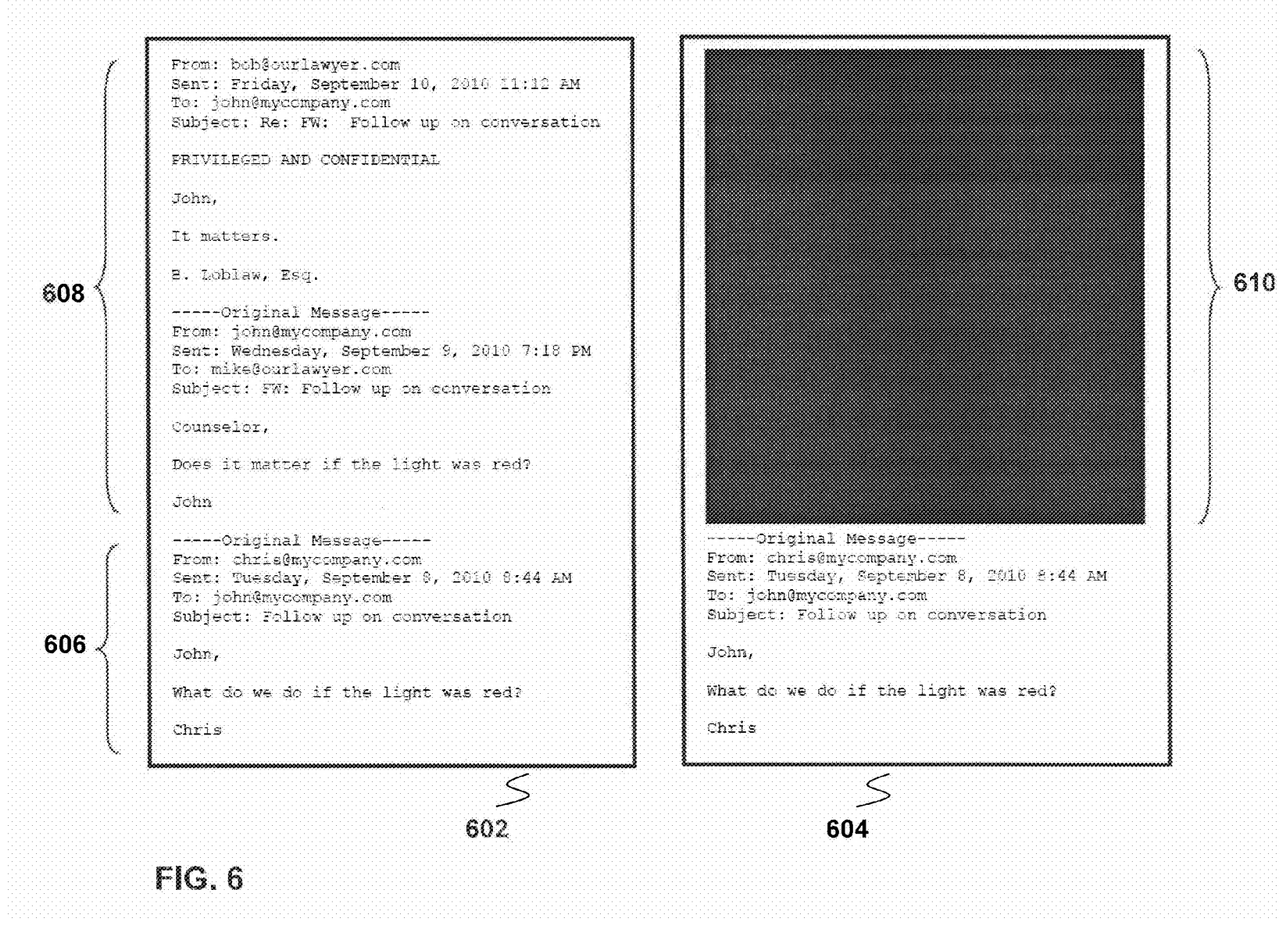
FIG. 6 illustrates an exemplary email before and after automated redaction, according to one embodiment.

Turning to FIG. 6, illustrated therein is an exemplary responsive email before redaction 602 and after redaction 604 according to one embodiment. In original responsive email 602, the first email message in thread 606 occurs between two employees of the company and is not privileged. The next communications 608 seek out and result in advice from an attorney. These communications are identified by e-discovery server 204 as privileged and can be automatically redacted 610 by output module 308. In addition, in another embodiment, the identification of outside counsel in the LIT communication based on domain name can be used to automatically generate a list of attorney names for use in subsequent responsive email processing.

Example Computer Embodiment

Figure 7:
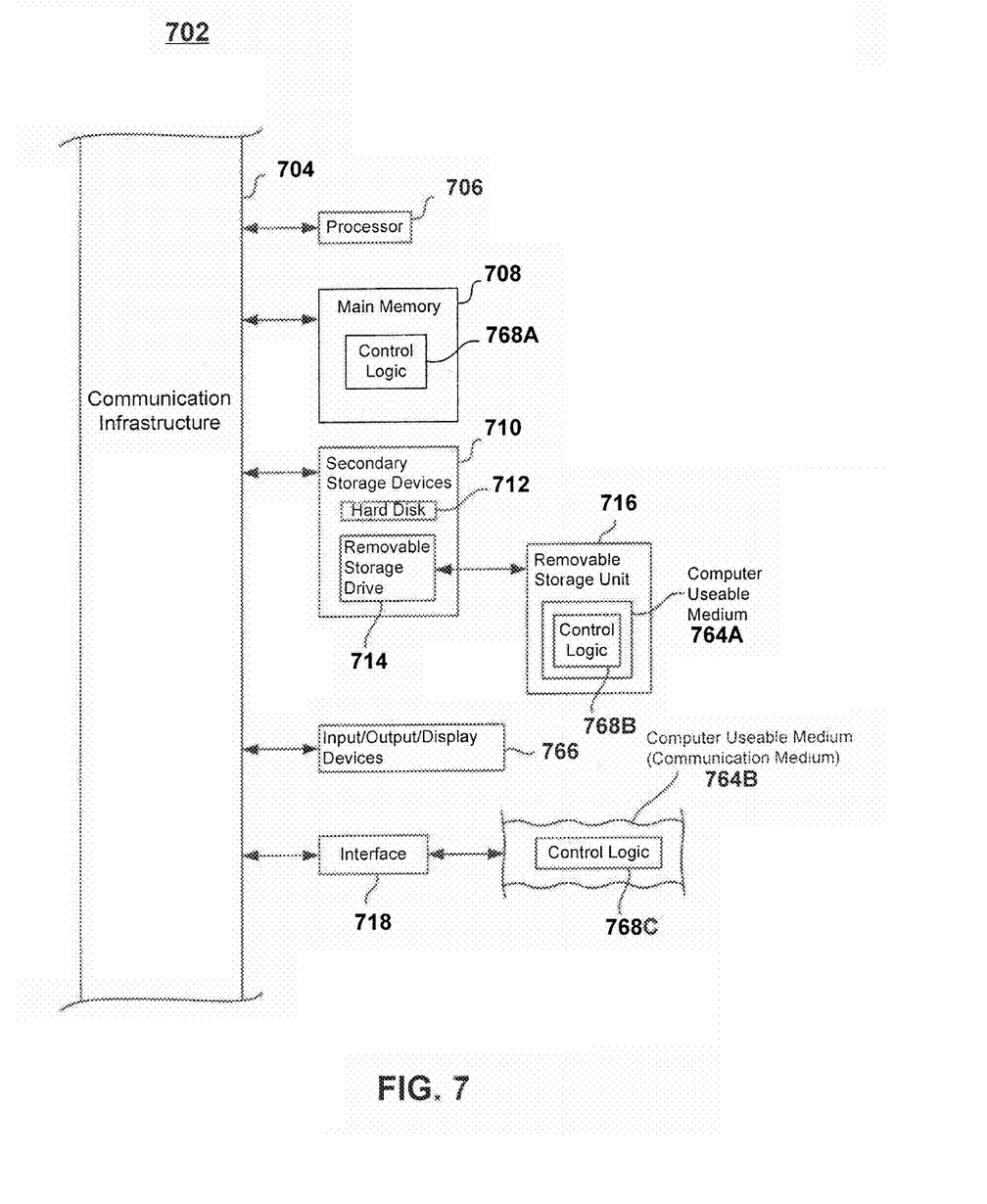
FIG. 7 illustrates an example computer useful for implementing components of the embodiments.

In an embodiment, the system and components of embodiments described herein are implemented using well known computers, such as example computer 702 shown in FIG. 7. For example, e-discovery server 204 or e-discovery client 202 can be implemented using computer(s) 702.

Computer 702 can be any commercially available and well known computer capable of performing the functions described herein, such as computers available from International Business Machines, Apple, Sun, HP, Dell, Compaq, Cray, etc. Computer 702 can also be any commercially available and well known tablet, mobile device or smart-phone capable of performing the functions described herein, such as devices available from Apple, HTC, RIM, Nokia, Sony, etc.

Computer 702 includes one or more processors (also called central processing units, or CPUs), such as a processor 706. Processor 706 is connected to a communication infrastructure 704.

Computer 702 also includes a main or primary memory 708, such as random access memory (RAM). Primary memory 708 has stored therein control logic 768A (computer software), and data.

Computer 702 also includes one or more secondary storage devices 710. Secondary storage devices 710 include, for example, a hard disk drive 712 and/or a removable storage device or drive 714, as well as other types of storage devices, such as memory cards and memory sticks. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 764A having stored therein computer software 768B (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 702 also includes input/output/display devices 766, such as monitors, keyboards, pointing devices, Bluetooth devices, etc.

Computer 702 farther includes a communication or network interface 718. Network interface 718 enables computer 702 to communicate with remote devices. For example, network interface 718 allows computer 702 to communicate over communication networks or mediums 764B (representing a form of a computer useable or readable medium), such as LANs, WANs, the Internet, etc. Network interface 718 may interface with remote sites or networks via wired or wireless connections.

Control logic 768C may be transmitted to and from computer 702 via communication medium 764B.

Any tangible apparatus or article of manufacture comprising a computer useable or readable medium having control logic (software) stored therein is referred to herein as a computer program product or program storage device. This includes, but is not limited to, computer 702, main memory 708, secondary storage devices 710 and removable storage unit 716. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

Conclusion

It is to be appreciated that the Detailed Description section, and not the Brief Summary and Abstract sections, is intended to be used to interpret the claims. The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for redacting privileged information from an email thread, comprising:
   identifying a set of email threads containing one or more potentially privileged emails;
   locating a particular email thread in the set of email threads containing correspondence with a non-privileged party;
   when the correspondence with the non-privileged party is a last-in-time email, marking the email thread as non-privileged; and
   when the correspondence with the non-privileged party is not the last-in-time email, automatically redacting emails from the email thread that are later in time than the correspondence with the non-privileged party.

2. The method of claim 1, wherein said automatically redacting emails is based on email message timestamps.

3. The method of claim 1, wherein said identifying a set of email threads containing one or more potentially privileged emails comprises searching the set of email threads for the presence of privilege terms or attorneys.

4. A method for redacting privileged information from an email thread, comprising:
   identifying a set of email threads containing one or more potentially privileged emails;
   locating a particular email thread in the set of email threads containing correspondence with a privileged party; and
   when the correspondence with the privileged party is not the last-in-time email, automatically redacting emails from the email thread that are later in time than the correspondence with the privileged party, including the correspondence with the privileged party.

5. The method of claim 4, wherein said automatically redacting emails comprises at least one of redacting emails in native format or redacting emails in searchable image format.

6. The method of claim 5, wherein said locating a particular email thread in the set of email threads containing correspondence with a privileged party comprises searching to, from, and cc, fields of the emails.

7. A computer implemented method for redacting, at a server, privileged information from an email thread, the method comprising:
   receiving, at the server, an email thread containing potentially privileged information;
   searching the email thread for an adverse party in a last-in-time communication;
   searching the email thread for an adverse party not in the last-in-time communication;
   searching the email thread for an attorney in the last-in-time communication;
   searching the email thread for an attorney not in the last-in-time communication;
   determining a portion of the email thread that is privileged; and
   automatically redacting the portion of the email thread that is privileged.

8. The method of claim 7, further comprising preparing the email thread for production in litigation discovery.

9. A computer-based system for redacting privileged information from an email thread, comprising:
   one or more processors;
   one or more repositories configured to store at least one of responsive documents, privileged parties, adverse parties, or privilege terms;
   a privilege determination module implemented on at least one of the processors that when executed by the at least one, processor receives a selected one of the responsive documents and to determine whether the selected one of the responsive documents is privileged based on the presence of at least one of the privileged parties, adverse parties, or privileged terms; and
   an output module configured to redact portions of the selected responsive document based on the privilege determination of the privilege determination module.

10. The system of claim 9, further comprising a domain name extraction module for extracting domain names from the email thread.

11. The system of claim 9, further comprising an email extraction module for extracting emails from the email thread.

12. The system of claim 11, wherein at least one of the one or more repositories is automatically populated by the email extraction module for extracting emails from the email thread.

13. A tangible computer program product comprising a non-transitory computer readable storage medium having computer program logic recorded thereon that, when executed by a processor, causes the processor to:
   identify a set of email threads containing one or more potentially privileged emails;
   locate a particular email thread in the set of email threads containing correspondence with a non-privileged party;
   when the correspondence with the non-privileged party is a last-in-time email, mark the email thread as non-privileged; and
   when the correspondence with the non-privileged party is not the last-m-time email, automatically redact emails from the email thread that are later in time than the correspondence with the non-privileged party.

14. The tangible computer program product of claim 13, wherein said computer readable storage medium having computer program logic recorded thereon that, when executed by a processor, causes the processor to automatically redact emails based on email message timestamps.

15. The tangible computer program product of claim 13, wherein said computer readable storage medium having computer program logic recorded thereon that, when executed by a processor, causes the processor to identify a set of email threads containing one or more potentially privileged emails by searching the set of email threads for the presence of privilege terms or attorneys.

16. The tangible computer program product of claim 13, wherein said computer readable storage medium having computer program logic recorded thereon that, when executed by a processor, causes the processor to automatically redact emails by at least one of redacting emails in native format or redacting emails in searchable image format.

17. The tangible computer program product of claim 13, wherein said computer readable storage medium having computer program logic recorded thereon that, when executed by a processor, causes the processor to locate a particular email thread in the set of email threads containing correspondence with a privileged party by searching to, from, and cc fields of the emails.

* * * * *

UNITED STATES PATENT AND TRADEMARK OFFICE
CERTIFICATE OF CORRECTION

| | | |
|---|---|---|
| PATENT NO. | : 8,752,204 B2 | Page 1 of 1 |
| APPLICATION NO. | : 13/564032 | |
| DATED | : June 10, 2014 | |
| INVENTOR(S) | : Davis et al. | |

It is certified that error appears in the above-identified patent and that said Letters Patent is hereby corrected as shown below:

In the Claims:

Column 10, line 51, please replace "last-m-time" with --last-in-time--.

Signed and Sealed this
Seventh Day of October, 2014

Michelle K. Lee
*Deputy Director of the United States Patent and Trademark Office*